United States Patent Office 3,137,697
Patented June 16, 1964

3,137,697
TETRAHYDROPYRIMIDINONE PRODUCTION
George A. Boswell, Windy Hills, Newark, Del., and Paul H. Williams, Orinda, Calif., assignors to Shell Oil Company, New York, N.Y., a corporation of Delaware
No Drawing. Filed Mar. 19, 1962, Ser. No. 180,816
4 Claims. (Cl. 260—251)

This invention relates to novel compositions of matter, to a method of preparing such compositions, and to a process for the preparation of heterocyclic nitrogen compounds from these novel compositions of matter. More particularly, the present invention relates to novel alkenal-carbamide condensates and to the preparation of hexahydropyrimidin-2-one and its nuclear substituted derivatives.

It is known that cyclic urea compounds may be prepared by the reaction of urea and a diamine. For example, cyclic trimethylene urea (also termed "hexahydropyrimidinone" and "tetrahydro-2-pyrimidinone") may be prepared by reacting 1,3-diaminopropane with urea. However, this process has serious shortcomings since the alpha,omega-diaminoalkyl starting compounds are expensive and are not readily available in commercial quantities. Furthermore, it is known that hexahydropyrimidinones can be obtained by catalytic hydrogenation of the reaction product obtained when two moles of urea are reacted with one mole of acrolein in the presence of an acid catalyst. However, this method invariably results in a mole of urea being split out during the hydrogenation step and results in low yields of a product which is contaminated with urea. In addition it is necessary to remove the excess acid prior to hydrogenation.

It is an object of the present invention to provide a new method for the production of trimethylene urea compounds and substituted derivatives thereof. A further object of the invention is to provide a method for the preparation of hexahydropyrimidin-2-one compounds and substituted derivatives thereof from urea without using a diamine reactant. Another object of the present invention is to provide a novel non-catalytic condensation reaction product which can be hydrogenated without contamination with carbamide by-products. A special object of the invention is to provide a novel composition of matter which may be readily hydrogenated to yield a substantially pure tetrahydro-2-pyrimidinone product which is free of carbamide contamination. Another particular object of the invention is the preparation of substituted urea compounds in which one urea-nitrogen atom is attached to a carbon chain of three carbon atoms with an amino or formyl group in the 3-position.

It has now been found that these and other objects may be accomplished by the catalytic hydrogenation of the reaction product obtained by the non-catalytic condensation of urea (or substituted urea) and an alpha,beta-unsaturated aldehyde to produce a tetrahydro-2-pyrimidinone compound.

In this application the term "tetrahydro-2-pyrimidinone" represents the compound:

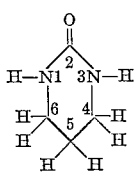

Substituted derivatives are named as derivatives of this compound. Thus, 1-ethyl-5-methyl-tetrahydro-2-pyrimidinone represents the compound:

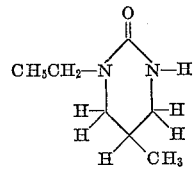

For brevity, these substituted and unsubstituted compounds are referred to in this application simply as "tetrahydropyrimidinones" or "pyrimidones."

The urea-alkenal condensation product which is catalytically hydrogenated according to the process of the present invention may be conveniently prepared by mixing urea (or an N-substituted urea) and an alpha,beta-unsaturated alkenal in the presence of a mutual solvent and refluxing the mixture at temperatures of from 40° C. to 150° C. In preparing the urea-alkenal condensation product, it is preferable to use approximately 1 to 1 molar ratios of alkenal to urea (or substituted urea). A slight (from .01 to 1 mole of alkenal per mole of carbamide) excess of alpha,beta-unsaturated aldehyde may be used in the process, but best results are obtained with essentially equimolar mixtures of alkenal and urea or substituted urea. Any excess of the carbamide or substituted carbamide reactant is to be avoided, since the presence of excess carbamide tends to give polymerized products and interferes with the formation of the 1:1 alkenal-carbamide adduct of the present invention. The condensation is conducted non-catalytically and without the use of an acid or base. Accordingly, the reaction of the present invention is conducted under conditions which exclude the presence of catalysts (including acids and bases) in amounts which cause the formation of polymeric products.

It is believed that the preparation of the urea-alkenal condensation product may be represented by the following equations:

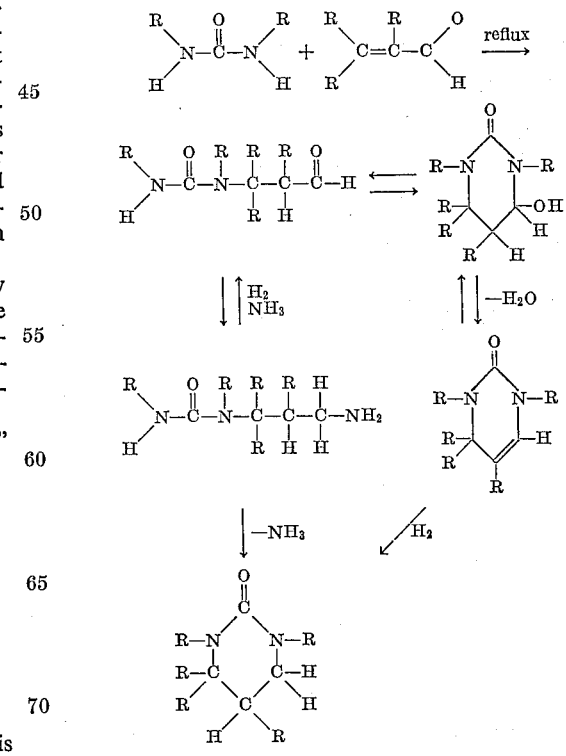

wherein R is selected from the group consisting of hydrogen and an organic group of from 1 to 10 carbon atoms.

The condensation may be carried out with or without a solvent. The use of a solvent which dissolves both the carbamide and the alpha,beta-unsaturated alkenal is preferred, however, because the products are then maintained in a fluid state and may be easily transferred to a hydrogenation vessel. Furthermore, it has been found that the condensation product of the carbamide and alpha,beta-unsaturated alkenal is completely stable when in solution and may be stored for months at room temperature without the formation of polymer or water-insoluble precipitates. The condensation product may thus be made up in advance, stored, and hydrogenated when needed. Suitable solvents include the alkanols with from 1 to 12 carbon atoms as well as polyhydric alcohols of from 2 to 12 carbon atoms and 2 or 3 hydroxyl groups. Branched alcohols with from 3 to 8 carbon atoms are good solvents for the process of the present invention. Iso-alcohols (such as isopropyl alcohol) are particularly suitable as solvents for the condensation reaction. Lower alcohols such as ethanol may also be used, but best results are obtained when iso-alcohols are employed. The condensation reaction is carried out without the aid of a catalyst. The carbamide and alkenal may also be reacted in the presence of water without any added catalyst to give a viscous liquid soluble in alcohols. Better yields are obtained, however, when the reaction is conducted without water with simultaneous removal of the water formed in the reaction. The reaction may be conducted at temperatures of from 40° C. to 150° C. When the reaction is conducted in the presence of a solvent (such as ethyl alcohol or isopropyl alcohol), the reaction mixture may be refluxed at from 60° C. to 125° C. When the reaction is conducted in the presence of water, the reaction temperature is usually held in the range of from 60° C. to 90° C.

The alpha,beta-unsaturated aldehyde reactants which are employed in the non-catalytic condensation reaction have the structural formula:

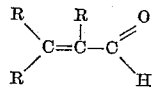

wherein R is hydrogen or an organic radical of from 1–10 carbon atoms. The R groups on the alpha or beta carbon atoms may be joined to form cyclic alpha,beta-unsaturated aldehydes. When R is an organic radical, R may be an alkyl, aryl, alicyclic, alkenyl, aralkyl, or alkaryl group of from 1–10 carbon atoms, with organic radicals of from 1 to 6 carbon atoms preferred. When R is an alkyl radical, lower alkyl radicals (1 to 4 carbon atoms) are suitable. Specific lower alkyl groups include methyl, ethyl, n-propyl, i-propyl, n-butyl, s-butyl, i-butyl and t-butyl. Other examples of R groups are phenyl, naphthyl, cyclopentyl, cyclohexyl, cyclopentenyl, cyclohexenyl, cycloheptenyl, allyl, vinyl, benzyl, tolyl, xylyl and cumyl groups. A particularly suitable class of compounds is composed of alpha,beta-unsaturated aldehydes of the formula:

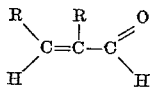

wherein R may be hydrogen or a lower alkyl group, and at least one R group is a lower alkyl group. Specific examples of suitable alpha,beta-unsaturated aldehydes are crotonaldehyde, alpha-methacrolein, alpha-methyl crotonaldehyde, cinnamaldehyde, 1 - cyclohexene - 1 - carboxaldehyde, 1 - cyclopentene - 1 - carboxaldehyde, and 1-cyclepentene - 1 - carboxaldehyde. Other alpha,beta-unsaturated aldehyde compounds which may be used include 2-pentenal, 2-heptenal, 5-methyl - 2 - hexenal, 2 - octenal, 2 - nonenal, 2 - decenal, 2,4 - heptadienal, 2,6 - heptadienal, 2,4 - decadienal, 3 - methyl - 2 - butenal, 3 - methyl-2 - heptenal, para-ethylbenzaldehyde, or the methoxybenzaldehyde, and 4-butoxy-2-pentenal.

The carbamide reactant used in the condensation step is urea or an N,N'-carbamide and is represented by the formula:

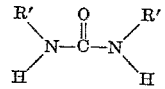

wherein each R' is selected from the group consisting of hydrogen and a monovalent organic radical of from 1 to 10 carbon atoms. Suitable organic groups include hydrocarbon radicals and hydrocarbonoxy (such as acyl and alkoxy) groups with from 1 to 10 carbon atoms. Exemplary R' groups with 1–10 carbon atoms which may be used are alkyl, aryl, aralkyl, alkaryl, alkenyl, alkoxy, acyl and alicyclic radicals. Thus, R' may be methyl, ethyl, propyl, butyl, acetyl, phenyl, benzyl, propenyl (allyl) and tolyl. Specific carbamide compounds which may be used are benzyl urea, n-butyl urea, sec-butyl urea, tert.-butyl urea, N,N'-diacetyl urea, N,N'-diethyl urea, N,N'-dimethyl urea, N,N'-diphenyl urea, p-phenetyl urea (p-ethoxy-phenyl-urea), N-ethyl-N'-phenyl urea, alpha-methylbutyl urea, beta-methylpropyl urea, allyl urea, propyl urea and o-tolyl urea. Thus, either one or both of the nitrogen atoms may contain organic substituents or hydrogen.

A particularly suitable method of carrying out the process of the present invention comprises reacting a carbamide and an alpha,beta-unsaturated aldehyde to form a condensation product which is hydrogenated to produce a pyrimidone. N,N'-substituted ureas with from 3 to 20 carbon atoms may be reacted with alpha,beta-unsaturated aldehydes containing from 3 to 20 carbon atoms. The N-alkyl-N'-alkyl ureas in which the alkyl moiety contains from 1 to 4 carbon atoms and 2-alkenal compounds with from 3 to 15 carbon atoms form a suitable subclass of reactants which may be condensed and then hydrogenated to the corresponding substituted tetrahydro-2-pyrimidinones.

The alkenal-carbamide condensation product may be hydrogenated in situ or may be continuously fed to a hydrogenation vessel or zone. The hydrogenation is most advantageously carried out catalytically. Raney nickel is a good catalyst for this purpose. Although other hydrogenation catalysts such as platinum, chromium, nickel, palladium, and chrome-nickel, may also be used, Raney nickel gives very good yields of product. The hydrogenation temperature is relatively low (from 80° to 200° C.). Temperatures of from 100° C. to 150° C. with a hydrogen pressure of from 300 p.s.i.g. to 2000 p.s.i.g. are particularly suitable. Excellent yields are obtained at temperatures from 125–200° C. and 1000–1500 p.s.i.g. It has further been discovered that the yields of the desired tetrahydropyrimidinones may be increased by using ammonia in the hydrogenation step. It is believed that the ammonia reacts with the mixture of condensation products to form an intermediate (a 1-(3'-aminoalkyl)-urea or a 3-(3'-aminoalkyl)-urea) which readily cyclizes to a tetrahydropyrimidinone and splits out ammonia. The ammonia added to the hydrogenation zone thus remains in the system and is not used up. Ureido pyrimidinones are not present in the carbamide-alkenal condensation product of the present invention. The amount of ammonia employed in the hydrogenation step may vary from 5 moles to 50 moles per mole of acrolein employed in preparation of the condensation product. Good results are obtained when the mole ratio of ammonia to acrolein is from 10 to 20 moles per mole of acrolein.

When ammonia is employed in the hydrogenation step, or immediately prior to hydrogenation, intermediate compounds are formed which have the formula:

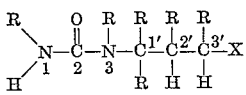

in which X represents an amino (—NH$_2$) or formyl

group and wherein R is selected from the group consisting of hydrogen and an organic group of from 1–10 carbon atoms. When R is an organic radical, R is preferably a hydrocarbon radical of from 1–10 carbon atoms. R may be an alkyl, aryl, alicyclic, alkenyl, aralkyl, or alkaryl group of from 1–10 carbon atoms, and preferably from 1 to 6 carbon atoms. When R is an alkyl group, lower alkyl radicals (1–4 carbon atoms) are preferred. Specific examples of such compounds include 1-methyl-3-(3'-aminopropyl)urea, 1 - (3' - aminopropyl)urea, 1 - propyl-3 - (3' - aminocyclohexyl)urea, 1 - ethyl - 3 - (3' - aminodecyl)urea, 1 - butyl - 3 - (3' - aminopentenyl)urea, 1-phenyl - 3 - (3' - amino - 2' - benzyl-propyl)urea and the corresponding compounds in which the amino group is replaced by the formyl group such as 1-methyl-3-(3'-formyl - 2' - methyl propyl)urea and beta-ureidopropionaldehyde. Such compounds may contain from 4–20 carbon atoms.

When the process of the present invention is operated continuously, the initial condensation of the alpha beta-alkenal and urea (or substituted urea) may be accelerated by recycling a portion of the reactants and continuously adding fresh reactants. The condensation mixture is then fed into a continuous hydrogenation apparatus preferably containing Raney nickel or chrome-Raney nickel, hydrogen and ammonia. The amount of ammonia in the hydrogenation zone may vary from 10 to 20 moles of ammonia per mole of alpha,beta-alkenal reacted with the urea or substituted urea. Up to 2000 moles of hydrogen per mole of alpha,beta-alkenal may be used. The temperature in the hydrogenation zone may be any temperature in the range of 110° C. to 300° C. with pressures of from 200 p.s.i.g. to 3000 p.s.i.g. Temperatures of at least 130–180° C. (with a maximum temperature of 300° C.) have been found to give good results at pressures from 600 p.s.i.g. to 2000 p.s.i.g. Excellent yields of hydrogenated product are obtained when a hydrogen pressure of 1200–1600 p.s.i.g. is maintained at a hydrogenation temperature of from 130° C. to 160° C. After the hydrogenation step, which is normally completed in a few minutes (5 to 15 minutes), the crude product is stripped under reduced pressure. The resulting tetrahydropyrimidinone compound may be further purified by crystallization from diethylene glycol, ethanol, or other suitable solvent. The color of the crystallized product (if any) may be removed by slurrying the recrystallized product with cold acetone followed by filtration.

The tetrahydropyrimidinone products of the present invention may be condensed with aqueous formaldehyde in the presence of acid or base to yield dimethylol tetrahydropyrimidinones which are useful in the treatment of textiles to impart crease-resistant properties to the fabrics. Dimethylol tetrahydropyrimidinones prepared from the substituted and unsubstituted tetrahydropyrimidinones manufactured according to the process of the present invention have superior resistance to discoloration caused by bleaches. For example, fabrics treated with dimethylol urea discolor extensively when washed with common bleaches such as the hypochlorites of sodium, potassium and calcium. The dimethylol pyrimidinones are not chlorine sensitive and may be advantageously used in fabrics which will be subjected to bleaching operations.

The following examples are submitted to further illustrate the invention but are not to be construed as limiting the invention in any way.

EXAMPLE I

Two moles (120 g.) of urea were dissolved in isopropyl alcohol at 70° C. and 147 cc. of 93% acrolein (equivalent to 123 g. of 93% acrolein or 2.02 moles) was added dropwise. The course of the reaction was followed by taking samples at intervals and determining the rate of acrolein consumption. About one-half of the acrolein was consumed in 12 hours, with approximately 90% conversion in 30 hours. The total volume of the reactants (including 2000 ml. of isopropanol) was 2200 ml. One-half (1100 ml.) of this reaction product (a clear pale amber mobile liquid) was hydrogenated in the presence of about 10–15 moles of ammonia (to produce 1-(3'-aminopropyl)-urea intermediate) per mole of acrolein at 150° C. and 1500 p.s.i.g. over 40 g. of Raney nickel. The hydrogenated reaction mixture was filtered to remove the catalyst. The hexahydropyrimidinone (tetrahydro-2-pyrimidinone) product which crystallized in the bomb was snow white, while the crystals isolated later had a tan color. The solution from the hydrogenation step was initially colorless but turned red-brown on exposure to air. The crystalline tetrahydro-2-pyrimidinone which was separated amounted to 50 g. The yield of recovered tetrahydro-2-pyrimidinone based on the amount of acrolein converted was 55.5%.

EXAMPLE II

A mixture of 2 moles of urea and 2 moles of acrolein (stabilized with hydroquinone) was refluxed in 2 liters of isopropyl alcohol for 14 hours under nitrogen. One-half of the resulting mixture was placed in a hydrogenation bomb with Raney nickel and 13 moles of ammonia. The mixture was pressured to 1500 p.s.i.g. with hydrogen at 140–150° C. The bomb was opened and crystalline tetrahydro-2-pyrimidinone was found mixed with the catalyst. The colorless liquid in the reaction mixture turned red-brown on exposure to air. Removal of the solvents left a crystalline residue of 148 g. wet with a syrup. Crystallization from isopropanol gave 30 g. of tetrahydro-2 - pyrimidinone. Additional tetrahydro - 2 - pyrimidinone was obtained by vacuum distillation of the residue giving a total yield of 50 g. of tetrahydro-2-pyrimidinone. The yield of tetrahydro-2-pyrimidinone was 80% based upon a 50% conversion of acrolein.

EXAMPLE III

Sixty grams (1 mole of urea was dissolved in 200 ml. of 95% ethanol and 56 g. of 93% acrolein (0.93 mole) stabilized with hydroquinone was added dropwise to the refluxing ethanolic solution. The reaction was carried out in a nitrogen atmosphere. The initial temperature was approximately 79° C. and was maintained between 70° C. and 80° C. for about 4½ hours. The acrolein addition was completed in 45 minutes. The resulting light yellow solution was stored overnight under refrigeration. During this time 72.4 g. of unreacted urea crystallized out. The mixture was filtered and the filtrate was hydrogenated at about 150° C. under pressures up to 1500 p.s.i.g. over Raney nickel catalyst. The resulting solution was separated from the catalyst to leave a pink solution smelling faintly of ammonia. The hydrogenated product was then stripped under vacuum to leave a crystalline residue composed of a mixture of tetrahydro-2-pyrimidinone, aminopropanol and tetrahydrooxazinone. Recrystallization of the crude product from ethanol gave colorless needles, M.P. 250–255° C.

EXAMPLE IV

Two moles (120 g.) of urea and 121 g. of 93% acrolein (2 moles) were heated to reflux in two liters of isopropyl alcohol in the presence of 500 g. of a molecular sieve of the Zeolite type (3 A.) to remove any water formed in the reaction. The mixture was refluxed for 75 hours, filtered, and 1860 ml. of filtrate recovered. A 1200 ml. aliquot of the filtrate was hydrogenated over Raney nickel at 150° C. and 1500 p.s.i.g. of hydrogen pressure. Hydrogen uptake was quite rapid, being very nearly complete before 150° C. was reached. The hydrogenated reaction product was stripped of isopropyl alcohol at reduced pressure. Separation of the products by vacuum distillation and recrystallization gave 14 g. of nearly colorless crystals of tetrahydro-2-pyrimidinone, M.P. 245–250° C.

EXAMPLE V 1,3-dimethylol-tetrahydro-2-pyrimidinone was prepared by reacting 73 g. (0.73 mole) of crude tetrahydro-2-pyrimidinone from Example I with 138 g. of 37% formaldehyde (1.6 moles) in 100 ml. of water. Phosphoric acid was added until a pH of 2.5 was reached. The reaction mixture was warmed. The product (1,3-dimethylol-tetrahydro-2-pyrimidinone) was kept in solution and suitable direct dilutions used to treat textiles. Thus, a 5% solution of 1,3-dimethylol-tetrahydro-2-pyrimidinone on cotton gave a combined (warp plus fill) crease recovery value of 207°; a 7.5% solution gave a value of 240° The control sample (untreated cloth) had a value of 121°. These results are summarized in Table I. All values were determined by the Monsanto Wrinkle Recovery Method (ASTM–D–1295–53T).

Table I

| Reagent | Concentration of Treating Reagent (Percent by wt.) | Warp | Filling | Total (Warp + Fill) |
|---|---|---|---|---|
| 1,3-Dimethylol-tetrahydro-2-pyrimidinone prepared in accordance with Example V | 5.0 | 101 | 106 | 207 |
|  | 7.5 | 116 | 124 | 240 |
| Control (untreated cotton cloth) | 0.0 | 58 | 63 | 121 |

In the Monsanto Wrinkle Recovery Method a sample of cloth (1.5 x 4.0 cm.) is placed in a specimen holder and folded over. This is placed in a plastic press and creased for 5 minutes under a 1½ pound load. The specimen holder containing the creased specimen is clamped in the tester which consists of the clamp attached to a movable protractor. The protractor is rotated until the free leg of the specimen is pointing directly downward to avoid influences of gravity. After five minutes (with continual adjustment keeping the free leg exactly vertical) the degrees recovery is read directly off the protractor scale.

The novel carbamide-alkenal condensation products prepared according to the present invention do not contain pyrimidinone compounds with ureido

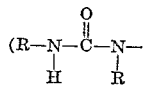

(wherein R is a hydrocarbon or hydrogen)

substituents. It is believed that the presence of such substituents in the condensation products of the prior art caused the extensive formation of polymers (solid and semi-solid) found in such condensates. When the alkenal-carbamide condensation products are produced by the process of the present invention, such polymerization is avoided. Thus, there is no formation of solid polymeric products in the process according to the present invention.

The initial carbamide-alkenal condensation products formed according to the present invention contain aminopropanols and cyclic carbamates such as tetrahydrooxazinone (and substituted tetrahydrooxazinones). The cyclic carbamates, for example, form polymers useful in forming laminates, molded articles, and cements when treated with sodium hydride. The aminopropanols are useful in the formation of emulsifying agents.

We claim as our invention:

1. A process for the production of tetrahydropyrimidinone compounds which comprises (1) reacting essentially equimolar quantities of urea and 2-alkenal, of from 3 to 15 carbon atoms, at a temperature of 40° C. to 150° C. in a catalyst-free reaction medium to form a 1:1 condensation product (2) catalytically hydrogenating said condensation product in the presence of ammonia to produce a tetrahydropyrimidinone.

2. A process in accordance with claim 1 wherein the 2-alkenal is acrolein.

3. A process for the production of tetrahydropyrimidinone compounds which comprises (1) reacting essentially equimolar quantities of urea and 2-alkenal, of from 3 to 15 carbon atoms, at a temperature of 40° C. to 150° C. in a catalyst-free reaction medium to form a 1:1 condensation product and (2) catalytically hydrogenating said condensation product to produce a tetrahydropyrimidinone.

4. A process in accordance wtih claim 3 wherein the 2-alkenal is acrolein.

References Cited in the file of this patent

UNITED STATES PATENTS

| 2,486,648 | Haury | Nov. 1, 1949 |
| 2,662,080 | Smith | Dec. 8, 1953 |
| 2,707,186 | Duschinsky | Apr. 26, 1955 |

FOREIGN PATENTS

| 57,249 | Netherlands | Apr. 15, 1946 |
| 476,533 | Germany | Aug. 16, 1925 |
| 924,489 | Germany | Mar. 3, 1955 |

OTHER REFERENCES

Zigeuner et al.: Monatsch., vol. 92 (1961), pages 31–4.
Zigeuner et al.: Monatsch., vol. 92 (1961), pages 278–81.
Sekine: Chem. Abstracts, vol. 52 (1958), col. 15, 425d (abstract of Kogyo Kagaku Zasshi, 59 (1956), 1369).
Linneweh: Chem. Abstracts, vol. 26 (1932), col. 3276 (abstract of Z. Physiol. Chem. 205 (1932) 126–32).